(12) United States Patent
Ambrosat et al.

(10) Patent No.: US 10,134,534 B2
(45) Date of Patent: Nov. 20, 2018

(54) CONNECTOR FOR CONNECTING A FIRST SHAPED ELEMENT TO A SECOND SHAPED ELEMENT

(71) Applicant: Siemens Aktiengesellschaft, Munich (DE)

(72) Inventors: Tim Ambrosat, Stralsund (DE); Pawel Biedunkiewicz, Berlin (DE); Jörg-Uwe Dahl, Werder (DE)

(73) Assignee: Siemens Aktiengesellschaft, Munich (DE)

( * ) Notice: Subject to any disclaimer, the term of this patent is extended or adjusted under 35 U.S.C. 154(b) by 354 days.

(21) Appl. No.: 14/513,338

(22) Filed: Oct. 14, 2014

(65) Prior Publication Data

US 2015/0162143 A1 Jun. 11, 2015

(30) Foreign Application Priority Data

Dec. 5, 2013 (DE) .................. 10 2013 225 029

(51) Int. Cl.
| | |
|---|---|
| *H01H 1/58* | (2006.01) |
| *F16B 5/00* | (2006.01) |
| *H01H 71/02* | (2006.01) |
| *F16B 2/14* | (2006.01) |
| *H01H 9/26* | (2006.01) |
| *F16B 5/06* | (2006.01) |

(52) U.S. Cl.
CPC .......... *H01H 1/58* (2013.01); *H01H 71/0271* (2013.01); *F16B 2/14* (2013.01); *F16B 5/0657* (2013.01); *H01H 9/26* (2013.01); *Y10T 403/7094* (2015.01)

(58) Field of Classification Search
CPC ...... H02B 1/042; H01R 25/14; H01R 25/162; H01R 9/2608; H01H 1/58; H01H 1/2058; F16B 5/0657; Y10T 403/7094
USPC .................. 439/712, 715, 717, 724; 71/235
See application file for complete search history.

(56) References Cited

U.S. PATENT DOCUMENTS 2,464,964 A * 3/1949 Charap .................. H01R 25/14
174/504
2,863,185 A * 12/1958 Riedi ................... B21D 39/037
29/521

(Continued)

FOREIGN PATENT DOCUMENTS

| | | |
|---|---|---|
| AU | 2004265697 A1 | 2/2005 |
| CN | 1836302 A | 9/2006 |

(Continued)

OTHER PUBLICATIONS

German Priority Application DE 102013225029.0, filed on Dec. 4, 2013.

(Continued)

*Primary Examiner* — Joshua J Michener
*Assistant Examiner* — Kyle J. Walraed-Sullivan
(74) *Attorney, Agent, or Firm* — Harness, Dickey & Pierce, P.L.C.

(57) ABSTRACT

A connector is disclosed for connecting a first shaped element to a second shaped element. The first shaped element and the second shaped element each include a dovetail guide. In an embodiment, the connector is provided with contact areas. The contact areas are designed to engage into the respective dovetail guides to connect the first and second shaped elements.

18 Claims, 3 Drawing Sheets

(56) References Cited

U.S. PATENT DOCUMENTS

| | | | | |
|---|---|---|---|---|
| 3,641,730 A * | 2/1972 | Meckstroth | ........... | E04B 1/6133 24/573.09 |
| 3,680,277 A * | 8/1972 | Martin | ................. | E04B 1/6154 52/438 |
| 3,686,817 A * | 8/1972 | Adams | ................. | F16B 5/0052 52/438 |
| 3,771,104 A * | 11/1973 | Clark | ................... | H01R 4/2487 439/415 |
| 4,004,799 A * | 1/1977 | Kundert | ............... | A63B 69/004 472/69 |
| 4,269,470 A * | 5/1981 | Ustin | ................... | H01R 9/2408 439/712 |
| 4,954,798 A | 9/1990 | Takato | | |
| 4,989,111 A * | 1/1991 | Sato | ................. | G11B 23/08714 242/344 |
| 5,012,044 A * | 4/1991 | Guyard | ................. | H01R 25/14 156/47 |
| 5,316,234 A * | 5/1994 | Honsho | ........... | G11B 23/08735 242/347.1 |
| 5,738,574 A * | 4/1998 | Tolles | .................... | B08B 1/007 257/E21.23 |
| 5,774,300 A * | 6/1998 | Eum | ................. | G11B 15/6656 360/85 |
| 6,007,386 A * | 12/1999 | Okabe | .................... | H01R 13/42 439/701 |
| 6,089,781 A * | 7/2000 | Kellberg | ............... | F16B 1/0014 403/297 |
| 6,142,813 A * | 11/2000 | Cummings | ...... | H01R 13/62905 439/357 |
| 6,151,856 A * | 11/2000 | Shimonohara | ........ | F16B 37/045 52/309.12 |
| 6,186,691 B1 * | 2/2001 | Rudolf-Bauer | ....... | E04B 1/6813 403/297 |
| 6,227,884 B1 * | 5/2001 | Hierzer | ................. | H01R 13/17 439/110 |
| 6,357,960 B1 * | 3/2002 | Cornelius | ............... | F16B 5/002 403/370 |
| 6,379,196 B1 * | 4/2002 | Greenberg | ............ | H01H 71/08 335/202 |
| 6,409,551 B1 * | 6/2002 | Nagai | ................ | H01R 13/6275 439/404 |
| 6,578,341 B2 * | 6/2003 | Hoffmann | ............ | E04B 1/2604 403/381 |
| 6,587,306 B1 * | 7/2003 | Ishikawa | .......... | G11B 23/08785 360/132 |
| 6,639,168 B1 * | 10/2003 | Castonguay | ........... | H01H 1/205 218/22 |
| 7,503,778 B2 * | 3/2009 | Lehman | ................. | F21V 21/35 362/147 |
| 7,559,807 B2 * | 7/2009 | Freimuth | ................. | H02B 1/14 439/717 |
| 8,147,162 B1 * | 4/2012 | Burnett | ................ | F16B 5/0052 312/263 |
| 8,544,233 B2 * | 10/2013 | Palsson | ................... | E04F 15/02 52/578 |
| 2005/0046539 A1 * | 3/2005 | Ciarcia | .................. | H01H 1/205 337/16 |
| 2007/0154257 A1 | 7/2007 | Guttormsen | | |
| 2007/0167043 A1 * | 7/2007 | Lehman | ................. | H01R 25/14 439/115 |
| 2007/0238356 A1 | 10/2007 | Sellner et al. | | |
| 2010/0111599 A1 * | 5/2010 | Baur | ........................ | B23C 3/30 403/350 |
| 2011/0073448 A1 | 3/2011 | Ahlert et al. | | |
| 2014/0174020 A1 * | 6/2014 | Massey | .................... | E06B 1/04 52/656.5 |

FOREIGN PATENT DOCUMENTS

| | | |
|---|---|---|
| CN | 1942637 A | 4/2007 |
| CN | 101047303 A | 10/2007 |
| DE | 2516527 A1 | 10/1976 |
| DE | 3316389 C2 | 8/1992 |
| DE | 102009048671 A1 | 3/2011 |

OTHER PUBLICATIONS

Chinese Office Action corresponding to Chinese Application No. 201410858487.7 dated Jul. 31, 2017.

* cited by examiner

CONNECTOR FOR CONNECTING A FIRST SHAPED ELEMENT TO A SECOND SHAPED ELEMENT

PRIORITY STATEMENT

The present application hereby claims priority under 35 U.S.C. § 119 to German patent application number DE 102013225029.0 filed Dec. 5, 2013, the entire contents of which are hereby incorporated herein by reference.

FIELD

At least one embodiment of the invention generally relates to a connector for connecting a first shaped element to a second shaped element, and/or to an arrangement comprising two pole cassettes and a connector.

BACKGROUND

Individual switching poles within a multi-pole compact circuit breaker can be mechanically connected to one another. In this case, it is important for both the moving parts, such as the rotors for example, and also the static elements, such as the shells of the various pole cassettes for example, to be able to be linked and connected to one another in each case.

The connection of the shells of the pole cassettes serves to establish a defined, constant distance between said pole cassettes, it being necessary for said distance to be maintained even under the action of force during normal operation or switching of the contacts. The plug connections engage between the rotors and synchronous rotation about the connecting shaft of the rotors is made possible only when the shells of the pole cassettes are arranged in a physically fixed manner in relation to one another and are coupled.

In the event of connection of the static components of the shells of the pole cassette, component tolerances which arise for various reasons may result in undesired stresses being produced in the transverse direction, said stresses likewise acting on the rotor shaft. Said stresses adversely affect the requisite smooth running of the rotation shaft and should be avoided as far as possible.

To date, pole cassettes or the shells of the pole cassettes have been fixed with elements which ensure an exclusively static connection.

SUMMARY

At least one embodiment of the invention provides a connector and/or an arrangement comprising two pole cassettes and a connector, which connector overcomes at least one of the disadvantages of a static connection between the shells of a pole cassette.

A connector is disclosed, in an embodiment, for connecting a first shaped element to a second shaped element, wherein the first shaped element and the second shaped element each comprise a dovetail guide, is provided with contact areas, wherein the contact areas are designed such that they can engage into the respective dovetail guide in order to connect the two shaped elements.

An arrangement is further disclosed. In an embodiment, the arrangement comprises two pole cassettes and at least one connector, wherein the two pole cassettes each comprise at least one shaped element with a dovetail guide, wherein the connector engages into the dovetail guides by way of its contact areas, and as a result connects the two pole cassettes to one another.

BRIEF DESCRIPTION OF THE DRAWINGS

The above-described properties, features and advantages of this invention, and also the way in which the properties, features and advantages are achieved, will become clearer and easier to understand in connection with the following description of the example embodiments which will be explained in greater detail in connection with the figures, in which.

DETAILED DESCRIPTION OF THE EXAMPLE EMBODIMENTS

Figure 1A:
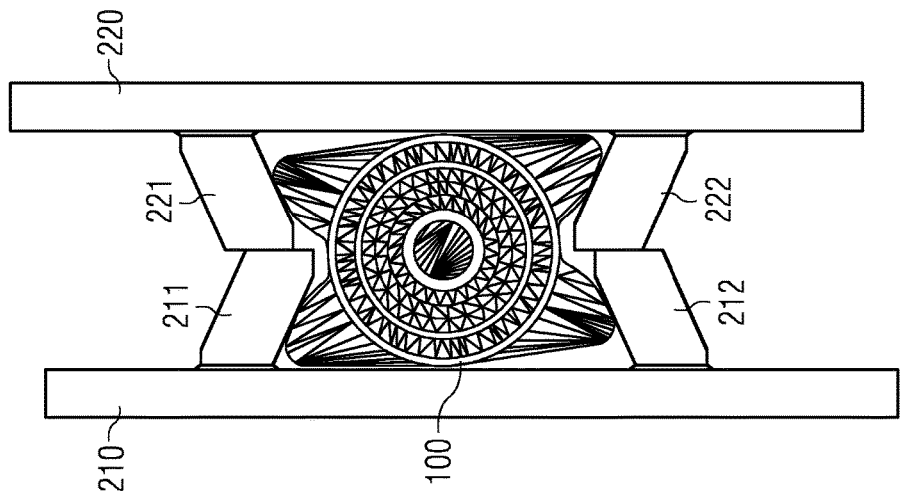
FIGS. 1A, 1B, 1C show connectors having a first and a second shaped element with different displacements between the first and the second shaped element.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

A connector is disclosed, in an embodiment, for connecting a first shaped element to a second shaped element, wherein the first shaped element and the second shaped element each comprise a dovetail guide, is provided with contact areas, wherein the contact areas are designed such that they can engage into the respective dovetail guide in order to connect the two shaped elements.

It is advantageous in this case that the two shaped elements can be securely connected to one another and, for example, component tolerances can be compensated for. The two shaped elements can move in relation to one another.

In one refinement of an embodiment, the contact areas are designed to engage around the dovetail guides in each case in pairs in order to connect the two shaped elements.

In a further refinement of an embodiment, the contact areas are provided with rear faces.

In one refinement of an embodiment, the connector comprises an inner part which is provided with the contact areas. The inner part can be cylindrical.

In one refinement of an embodiment, the rear faces are in the form of tangents of the cylindrical inner part.

The contact areas and the rear faces can form an opening angle ($\alpha$) which is larger than the opening angle ($\beta$) of the dovetail guides. As an alternative, the contact areas and the rear faces can form an opening angle ($\alpha$) which is equal to the opening angle ($\beta$) of the dovetail guides.

In one refinement of an embodiment, the contact areas and the rear faces in each case meet at a corner or rounded portion.

An arrangement is further disclosed. In an embodiment, the arrangement comprises two pole cassettes and at least one connector, wherein the two pole cassettes each comprise at least one shaped element with a dovetail guide, wherein the connector engages into the dovetail guides by way of its contact areas, and as a result connects the two pole cassettes to one another.

In one refinement of an embodiment, the dovetail guides make contact, the cylindrical inner part has a diameter which is smaller than the distance between the shaped elements, and said cylindrical inner part therefore does not make contact with either of the at least one shaped elements.

In an alternative refinement of an embodiment, the dovetail guides do not make contact, and the distance between the shaped elements is determined by the cylindrical inner part. Some of the rear faces can likewise make contact with the shaped element.

Figure 1B:
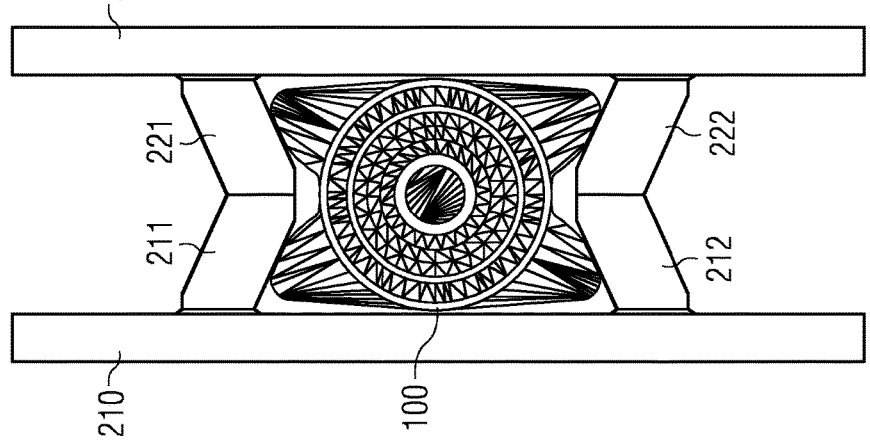
Figure 1C:
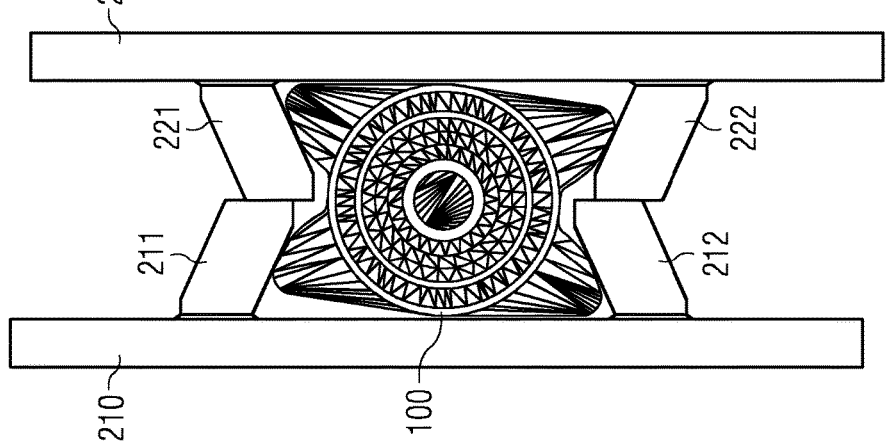

FIGS. 1A, 1B and 1C each show a connector 100 for connecting a first shaped element 210 to a second shaped element 220. The first shaped element 210 comprises a dovetail guide 211, 212. The dovetail guide comprises two arms 211, 212. The second shaped element 220 comprises a dovetail guide 221, 222 which likewise comprises two arms.

The connector 100 makes it possible to fasten the two shaped elements 210, 220 to one another. A certain amount of play in a predetermined direction is nevertheless ensured by the connectors 100, while the distance between the shaped elements 210, 220 remains virtually the same. According to FIGS. 1A, 1B and 1C, the predetermined direction of movement is the direction upward and downward. In FIG. 1B, the shaped elements 210, 220 are arranged in a line, in FIG. 1A the shaped element 210 is displaced upward in relation to the shaped element 220, and in FIG. 1C the shaped element 210 is displaced downward in relation to the shaped element 220. The connector 100 makes all of said displacements possible, wherein the distance between the shaped elements 210, 220 additionally remains virtually constant.

One example embodiment of the connector 100 for connecting a first shaped element 210 to a second shaped element 220 is designed in the following way in accordance with FIG. 3 in order to ensure this ability to move. Said connector comprises a cylindrical inner part 110 which is provided with contact areas 122, 123; 126, 127, wherein the contact areas are designed such that they can engage into the respective dovetail guide 211, 212; 221, 222 in order to connect the two shaped elements 210, 220. The respective pairs of contact areas 122, 123 and 126, 127 are designed such that they can engage around the respective dovetail guides 211, 212 and 221, 222.

Figure 3:
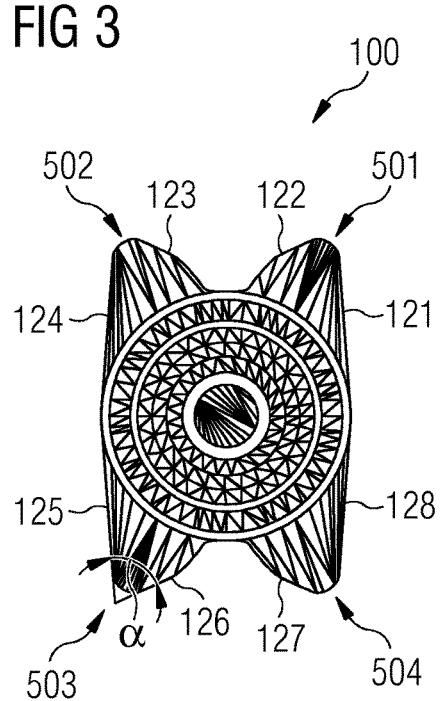
FIG. 3 shows connectors with contact areas at an angle $\alpha$.

According to FIG. 3, the contact areas 122, 123; 126, 127 are provided with rear faces 121, 124; 125, 128. In the example embodiment, the rear faces 121, 124; 125, 128 are in the form of tangents of the cylindrical inner part 110.

A contact area and the corresponding rear face form an angle $\alpha$ in each case. By way of example, in FIG. 3, the contact area 126 and the corresponding rear face 125 meet at a corner or rounded portion 503. In accordance with FIG. 3, the contact area 127 and the rear face 128 meet at the corner or rounded portion 504, the contact area 122 and the rear face 121 meet at the corner or rounded portion 501, and the contact area 123 and the rear face 124 meet at the corner or rounded portion 502. The angles $\alpha$ can be identical for each corner or rounded portion 501, 502, 503, 504. However, it is likewise feasible for the contact areas and rear faces to be at different angles in relation to one another.

Figure 2:
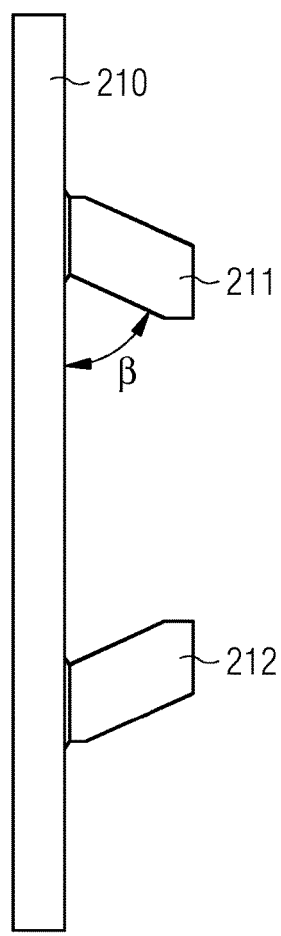
FIG. 2 shows a shaped element with an opening angle $\beta$ of the dovetail guide.

According to FIG. 2, the dovetail guides 211, 212 form an opening angle $\beta$ into which the contact areas of the connector 100 can engage. The angle of the contact areas $\alpha$ is greater than the opening angle $\beta$ of the dovetail guides 211, 212. It is likewise feasible for the angle of the contact areas $\alpha$ to be identical to the opening angle $\beta$ of the dovetail guides 211, 212.

Figure 4:
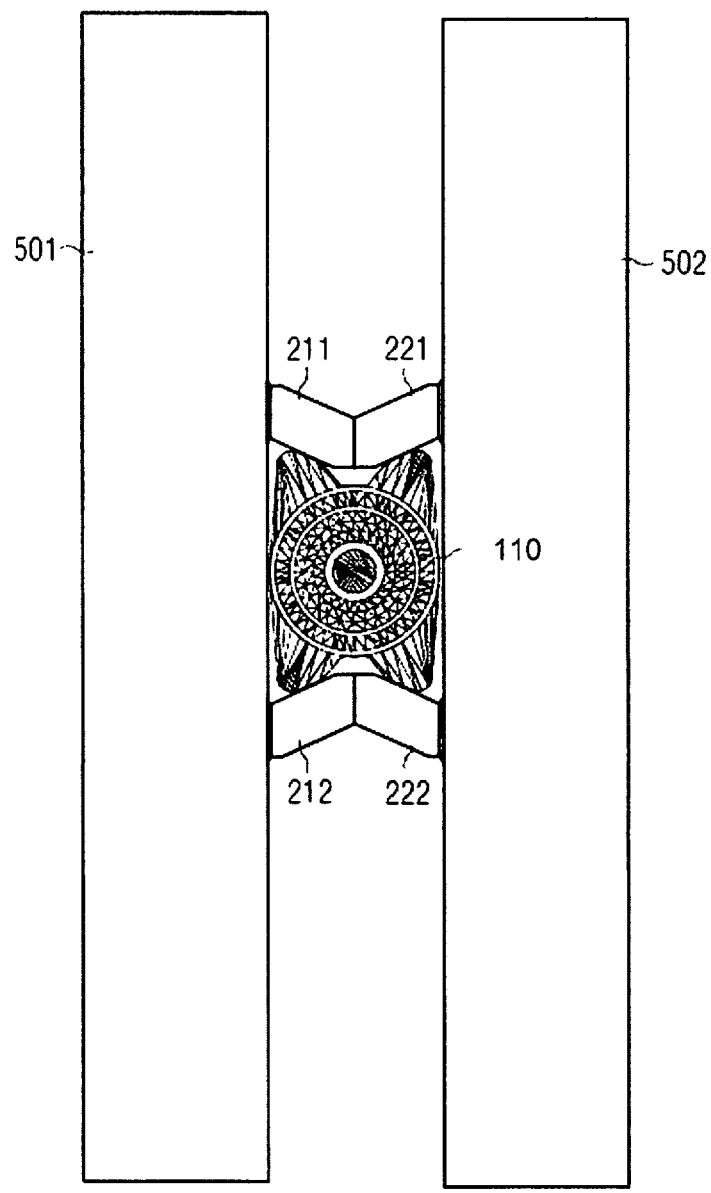
FIG. 4 shows an arrangement comprising pole cassettes and a connector.

FIG. 4 shows two pole cassettes 501, 502 which each comprise a dovetail guide 211, 212; 221, 222. The connector 100 according to an embodiment of the invention engages into the dovetail guides 211, 212; 221, 222 by way of its contact areas 122, 123; 126, 127 and in this way connects the two pole cassettes 501, 502 to one another.

According to FIGS. 1A, 1B, 1C, the dovetail guides 211, 212; 221, 222 make contact. The cylindrical inner part 110 has a diameter which is smaller than the distance between the shaped elements 210; 220, and therefore the inner part 110 does not make contact with either of the shaped elements 210; 220.

As an alternative, it is feasible for the dovetail guides 211, 212; 221, 222 to not make contact and for the distance between the shaped elements 210; 220 to be determined by the cylindrical inner part 110. In this alternative arrangement, some of the rear faces 121, 124; 125, 128 can likewise make contact with the shaped element 210; 220.

Owing to the contact areas 122, 123; 126, 127 of the connector 100, the connector 100 can rotate within the dovetail guides 211, 212; 221, 222. This rotation causes a parallel displacement of the shaped elements 210, 220 and of the respective dovetail guides 211, 212; 221, 222 in relation to one another, while the distance remains the same. This creates tolerance compensation which is automatically established when, for example, the pole cassettes 501, 502 are connected. In this way, the plugged-together shaft of the rotors is relieved of loading by transverse forces.

Since the connections of the dovetail guides 211, 212; 221, 222 are of rotatable design, the connector 100 can rotate to a certain extent and therefore allow the pole cassettes 501, 502 to be offset, without the distance between them being significantly influenced. The parallelism of the pole cassettes 501, 502 also remains untouched since the connector 100 has enough room to rotate in the two dovetail guides 211, 212; 221, 222.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A connector for connecting a first shaped element to a second shaped element, the connector comprising:
   a plurality of substantially planar surfaces each configured to engage an angled dovetail guide of at least one of the first and second shaped elements and configured to connect the first and second shaped elements to one another such that a distance between the first shaped element and the second element remains substantially the same while providing displacement between the first shaped element and the second shaped element in one direction; and
   at least six apexes projecting from a center of the connector, at least four of the at least six apexes including an acute angle and at least two of the at least six apexes including an obtuse angle and each of the at least six apexes connecting first and second respective surfaces of the plurality of substantially planar surfaces.

2. The connector of claim 1, further comprising an inner part including the center of the connector.

3. The connector of claim 2, wherein the inner part is cylindrical.

4. The connector of claim 3, wherein each of the plurality of substantially planar surfaces is tangential to the inner part at a point of contact between the inner part and a respective substantially planar surface.

5. An arrangement, comprising:
   two pole cassettes; and
   at least one connector, the at least one connector including the connector of claim 1,
   wherein the two pole cassettes each comprise the first or the second shaped element,
   and wherein the at least one connector is configured to engage into the angled dovetail guide of the first or the second shaped element by way of the plurality of substantially planar surfaces, and
   connect the two pole cassettes to one another such that a distance between the first and second shaped elements remains substantially the same while providing displacement between the two pole cassettes in one direction.

6. The arrangement of claim 5, further comprising:
a cylindrical inner part having a diameter length less than a length of a distance between the first and second shaped elements and wherein said cylindrical inner part does not make contact with either of the at least one shaped elements.

7. The arrangement of claim 5, wherein the angled dovetail guide does not make contact with one of the first or the second shaped elements, and a length of a distance between the shaped elements is determined by a cylindrical inner part of the connector.

8. The arrangement of claim 5, wherein at least one of the plurality of substantially planar surfaces makes contact with the first or second shaped element.

9. The arrangement of claim 5, further comprising an inner part including the center of the connector.

10. The arrangement of claim 9, wherein the inner part is cylindrical.

11. The arrangement of claim 10, wherein each of the plurality of substantially planar surfaces is tangential to the inner part.

12. The arrangement of claim 9, wherein the first and second respective surfaces of the plurality of substantially planar surfaces form an opening angle which is relatively larger than an opening angle of the angled dovetail guide.

13. The connector of claim 1, further comprising:
at least eight obtuse apexes, at least six of the eight obtuse apexes projecting from the center of the connector.

14. The connector of claim 3, further comprising:
a first apex of the at least six apexes and a second apex of the six apexes, the first apex and the second apex opposing each other with respect to the center of the connector and having each an angle greater than any other apex of the at least six apexes.

15. The connector of claim 1, wherein the first and second respective surfaces of the plurality of substantially planar surfaces and at least two of the at least six apexes together have an arcuate cross-section.

16. The arrangement of claim 5, wherein the first and second respective surfaces of the plurality of substantially planar surfaces and at least two of the at least six apexes together have an arcuate cross-section.

17. The connector of claim 4, wherein the first and second respective surfaces of the plurality of substantially planar surfaces and at least two of the at least six apexes together have an arcuate cross-section.

18. The connector of claim 11, wherein the first and second respective surfaces of the plurality of substantially planar surfaces and at least two of the at least six apexes together have an arcuate cross-section.

* * * * *